United States Patent Office 3,525,737
Patented Aug. 25, 1970

3,525,737
N,N'-SULFIDES AND METHOD OF MAKING THE SAME
Rudolf Kern, Hambach, and Ivan Butula, Heidelberg-Pfaffengrund, Germany, assignors to Rhein-Chemie G.m.b.H., Mannheim, Germany
No Drawing. Filed Dec. 5, 1967, Ser. No. 687,971
Claims priority, application Germany, Dec. 8, 1966, R 44,754, R 44,755
Int. Cl. C07d 41/06
U.S. Cl. 260—239.3   18 Claims

ABSTRACT OF THE DISCLOSURE

Compounds of the formula:

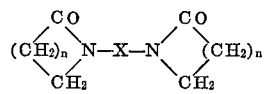

wherein X is either S or S—S, and $n$ is an integer between 1 and 10, both inclusive, are prepared by reacting a lactam having a free hydrogen atom or a metal atom directly attached to nitrogen with a substance selected from the group consisting of sulfurdichloride ($SCl_2$) and disulfurdichloride ($S_2Cl_2$). The compounds are useful as fungistats.

BACKGROUND OF THE INVENTION

N,N'-sulfides of lactams and methods of producing the same apparently have not been disclosed up to now. With respect to N,N'-monosulfides of this type, only the reaction of $SCl_2$ with potassium phthalimide is known which results in the formation N,N'-thio-bis-phthalimide. This compound may also be obtained by reacting sulfurdichloride with phthalimide by carrying out the reaction in N,N'-dimethylformamide as solvent (Canad. Jour. of Chem., 44 (1966), p. 2111). Although, for reasons which will be discussed below, an analogous reaction could not be expected, it had been attempted to replace for reaction with sulfur dichloride the phthalimide which carries a free acidic hydrogen atom at the nitrogen atom, with secondary carboxylic acid amides which also have a free hydrogen atom directly attached to nitrogen. It was found that in fact N,N'-sulfides could not be obtained but practically only sulfur in addition to unreacted starting material, as will be described in one of the examples further below.

Notwithstanding a certain formal correlation with respect to free hydrogen attached to nitrogen, it was found that the phthalimide as representative of the carboxylic acid imides, on the one hand, which are characterized by the group —CO—NH—CO— and, on the other hand, the secondary carboxylic acid amides which are characterized by the group —CO—NH—, represent two different groups of compounds which cannot be compared with respect to their reactivity. This difference seems to be due to the different reactivity of the hydrogen atom which is directly connected to nitrogen, and the different basicity of the two groups of compounds. Consequently, it was not possible to just copy the above described reaction scheme by reacting sulfur dichloride with open-chain secondary carboxylic acid amides and the same holds true with respect to the nitrogen salts thereof.

Similarly, N,N'-dilactam-disulfides also appear to be novel. Applicants could not find a published method for producing these compounds.

The effect of disulfurdichloride on secondary carboxylic acid amides is discussed in various publications, namely:

Hope, J.C.S. (Lond.), 1965, 4583, wherein the reaction of malonanilide with disulfurdichloride in benzene is described as causing a substitution at the carbon, however, not to produce any N,N'-disulfide.

Naik, J.C.S. (Lond.), 119, 1166, wherein the reaction between benzeneanilide, without solvent, and disulfurdichloride is shown to result in a substitution at the aromatic core, however not in the formation of N,N'-disulfides.

Naik, C. 1925 I, 488, wherein it is shown that the action of i-butyranilide, phenylacetanilide or acetylsalicylanilide in petroleumether leads to a substitution at the aromatic core without producing any N,N'-disulfide.

Naik, C. 1928, 1759. This publication discloses that the reaction of disulfurdichloride with substituted malonamides, such as malonethylamide, malonisobutylamide, malonpropylamide (in benzene), malonheptylamide (in sealed tube), or malone-m-toluidide (without solvent) causes substitution at the carbon but does not yield any N,N'-disulfide. Mainly thioketones are formed hereby. The same reference also discloses that the reaction of disulfurdichloride with substituted methylmalonamide results in the formation of dithioether, i.e., C—S—S—C— compounds but again no N,N'-disulfides are obtained.

In none of the papers referred to above did reaction of disulfurdichloride with certain secondary carboxylic acid amides cause the formation of N,N'-disulfides.

Applicants' attempt to react secondary carboxylic acid amides with disulfurdichloride also did not make it possible to isolate N,N'-disulfides. Upon reacting disulfurdichloride with N-methyl-acetamide, N-methyl-butyramide, N - butyl-acetamide, N-cyclohexyl-acetamide, N-propyl-propionamide and N-butyl-laurin-amide, only easily decomposable brown oils were formed which according to thin layer chromatographic determination consisted of several different compounds.

It is therefore an object of the present invention to provide new compounds and a method of producing the same, which compounds correspond to the formulae:

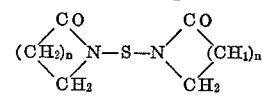

and

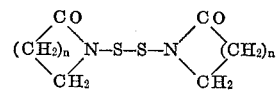

SUMMARY OF THE INVENTION

The present invention is concerned with new N,N'-monosulfides and new N,N'-disulfides which are produced by reacting lactams which have a free hydrogen atom or a metal atom directly connected to nitrogen, with sulfur dichloride or disulfurdichloride, preferably in an inert solvent, and preferably in the presence of an acid acceptor.

According to a particularly preferred embodiment of the present invention, an excess amount of the lactam (beyond the amount thereof which will be reacted with the sulfur dichloride or disulfurdichloride) is used as the acid acceptor.

The compounds which are produced according to the present invention correspond to the formula:

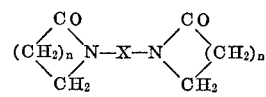

wherein X is either S or S—S, and $n$ is an integer between 1 and 10, both inclusive.

The new compounds exhibit fungistatic properties and particularly the N,N'-disulfides of the present invention have been found to be very effective in this respect. Thus, for instance, N,N'-dicaprolactamdisulfide prevents growth of *Trichophyton mentagrophytes* in dilutions of 1:500 and 1:1000. This compound was also found to be of significant effectiveness with respect to suppression of the growth of *Candida albicans*.

DESCRIPTION OF THE PREFERRED EMBODIMENTS

According to the present invention, new N,N'-monosulfides and N,N'-disulfides are produced by reacting lactams which have a free hydrogen atom or a metal atom attached to the nitrogen atom, with sulfurdichloride if monosulfides are to be prepared, or with disulfurdichloride if disulfides are to be prepared.

Preferably, the reaction is carried out in an inert solvent and with the addition of an acid acceptor.

As has been pointed out further above, the reaction of disulfurdichloride with secondary carboxylic acid amides does not result in the formation of the desired N,N'-disulfides, however, surprisingly it has been found that by replacing the secondary carboxylic acid amides with the chemically rather closely related lactams described above, the N,N'-disulfide is easily obtainable and in a good yield.

The N,N'-dilactam-disulfides are formed thereby as easily crystallizable stable compounds in accordance with the following equation:

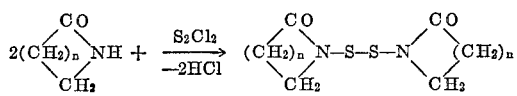

In the above equation $n$ denotes an integer between 1 and 10, both inclusive, and preferably an integer of between 2 and 6, both inclusive.

The failure to achieve the desired reaction between disulfidedichloride and open-chain secondary carboxylic acids, and the easy manner in which this reaction proceeds by replacing the open-chain secondary carboxylic acid amides with the above described lactams, is particularly surprising inasmuch as there is no substantial difference between the open chain secondary carboxylic acid amides and the cyclic secondary carboxylic acid amides, i.e. the lactams, with respect to the basicity of the respective compounds.

The new group of compounds, i.e., the N,N'-dilactam-disulfides may be easily obtained by the above-described reaction of the present invention, namely by reacting a lactam which has a free hydrogen atom or a metal atom directly attached to the nitrogen atom, with disulfur-dichloride, preferably utilizing inert solvents and also preferably with the addition of acid acceptors.

Generally, this reaction of the present invention is carried out in such a manner that the lactam is dissolved or suspended in a suitable solvent, the acid acceptor is added and the disulfurdichloride slowly introduced while stirring and, if necessary, cooling. However, the reaction is not to be considered limited to the above described sequence of the admixture of the various components. For instance, it is also possible to first mix the acid acceptor with the inert solvent, thereafter to add the lactam and finally to stir the disulfurdichloride into the mixture. Other sequences of the addition of the reaction components are also possible.

The present invention may be advantageously carried out by utilizing the following lactams, however, without being limited to reactions of these specifically mentioned compounds: pyrrolidone, piperidone, caprolactam, enanthlactam, capryllactam, caprinlactam, laurinlactam, and substituted lactams such as ε-ethyl-ε-caprolactam, φ-ethyl-φ-enanthlactam, etc.

Suitable acid acceptors are organic bases which will not react with sulfurchlorides such as: pyridine, quinoline, dimethylaniline, dialkylcyclohexylamine, N-methyl-pyrolidine, N-ethyl-piperidine, tetramethyl-ethylenediamine, dimethylhexylamine, dimethyldodecylamine, ethyldiisopropylamine, tetramethylethylenediamine, dialkylcyclohexylamine, N-alkyl-pyrolidine, and N-alkyl-piperidine, as well as tertiary alkyl amines or diamines in addition to those specifically mentioned.

However, it is also within the scope of the present invention to carry out the reaction without acid acceptors, or with inorganic bases or their salts such as carbonates or bicarbonates as acid acceptors. It is not necessary that the inorganic acid acceptors are soluble in the reaction mixture. If the acid acceptors are insoluble in the reaction mixture, the reaction will proceed as a heterogeneous phase reaction.

It is possible to obtain the same final products, namely the desired N,N-dilactam-disulfides if the hydrogen atom which is bound to the amide nitrogen atom of the lactam is exchanged for a metal and such metal salts of the lactams are reacted with disulfur-dichloride in accordance with the following equation:

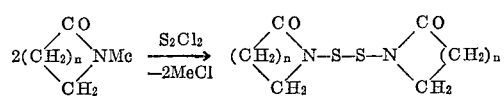

The lactams which are reacted may themselves serve as acid acceptors in accordance with the following equation:

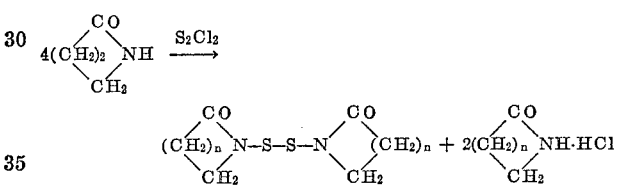

By proceeding in accordance with the last equation, the desired N,N-dilactam-disulfides may also be obtained and the hydrochloride-acid salts of the lactams which accrue thereby as by-products may advantageously be reworked to form thereof again lactams which may be used for subsequent reaction with disulfidedichloride or sulfide-dichloride.

However, it is also possible to carry out the reaction without an excess of lactam and without the addition of an acid acceptor and to remove the hydrogen chloride formed during the reaction by heating of the reaction mixture or by applying a partial vacuum, or by passing a purging gas through the reaction system.

Preferably, lactams containing between 3 and 12, and most preferably between 4 and 8, carbon atoms in the lactam ring are used for the above-described reaction. It has been found that by reacting lactams with between 4 and 8 carbon atoms in the lactam ring the yield of the corresponding N,N-disulfides is practically uniform and particularly good, whereas with increasing ring size beyond 8 carbon atoms the yield will become progressively smaller.

If solvents are used, preferably such solvents should be chosen which do not, or only very slowly, react with disulfurdichloride.

Suitable solvents include aliphatic and aromatic hydrocarbons, for instance hexane, octane, cyclohexane, light petroleum, benzene, toluene, xylene, as well as halogenated hydrocarbons such as chloroform, trichloroethylene, carbontetrachloride, as well as polar solvents such as ether, dioxane, acetic acid ester, dimethylformamide, dimethylacetamide, dialkylsulfoxide, etc.

The final product obtained by the above-described reaction has been identified as disulfide, not only by elementary analysis but also by infrared spectroscopy, and it has been found that it is in fact a N,N'-disulfide and not another compound, for instance a C,C'-disulfide.

The complete absence of —NH— absorption in the range between 3,100 and 3,400 cm.⁻¹ is compatible only with a structural arrangement

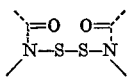

In the case of a

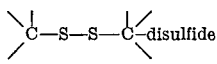

a —NH— group and the corresponding absorption in the above-indicated range would have to be present.

The carbonyl-absorption of the lactam is found transposed in the direction towards shorter wave length. This can be easily understood in the case of a N-lactam, since sulfur attracts electrons more strongly than hydrogen and therefore the mesomeric form

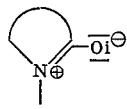

of the lactam which is responsive for absorption at longer wave length will be less favored.

The further fact that by proceeding in accordance with the present invention, namely by reacting lactams as cyclic secondary carboxylic acid amides—in contrast to open chain secondary carboxylic acid amides—with sulfurdichloride, easily crystallizable and stable N,N'-monosulfides can be obtained in a good yield, was also not foreseeable and is highly surprising for the reasons discussed above, namely that cyclic and open chain carboxylic acid amides appear to be closely related in many respects and also have a basicity of substantially the same magnitiude.

The method of producing the N,N'-monosulfides corresponds essentially to the method described in connection with producing N,N'-disulfides, whereby, of course, S₂Cl₂ is replaced by SCl₂ if the N,N'-monosulfides are to be produced.

The respective lactam may be placed into the reaction vessel, preferably together with an inert solvent in which the lactam is either dissolved or suspended, thereafter the acid acceptor is added and then the sulfur dichloride is slowly introduced while stirring the reaction mixture. However, as also pointed out in connected with the method of producing N,N'-disulfides, the above sequence of introducing the reaction components is not to be considered as limiting. Again, preferably lactams with between 3 and 12 and most preferably between 4 and 8 carbon atoms in the lactam ring are used as the starting product, and thus the same lactams may be used for producing either the monosulfide or the disulfide, the difference in the end product being controlled by the use of either sulfurdichloride or disulfurdichloride. The lactams again may be replaced by their metal salts and particularly their alkali metal salts, whereby it will become unnecessary to add an acid acceptor.

The acid acceptors which may be used are the same as may be used for producing the disulfide.

Also similar to the variations of the method described in connection with producing N,N'-disulfides, it is possible to use an excess of the lactam as the acid acceptor and to work up the lactam hydrochloride obtained thereby in, per se, conventional manner to recover the lactam which then may be used again for reaction with sulfurdichloride. Again it is also possible to work without an excess of lactam and without an acid acceptor and to remove the hydrogen chloride in, per se, conventional manner by heating, applying of a partial vacuum or utilization of an inert purging gas.

The reaction is preferably carried out in a solvent, and here again the solvents mentioned in connection with producing the N,N'-disulfides may be utilized.

The structure of the new compounds obtained according to the present invention with sulfurdichloride as one of the reactants, which compounds, according to thin layer chromatography and elementary analysis will be present in pure form after having been recrystallized once, were subjected to infrared spectroscopy, and the complete absence of absorption in the range of 3,100 and 3,400 cm.⁻¹ proved conclusively that the compounds produced according to the present invention were not C,C'-sulfides, but in fact N,N'-sulfides.

Furthermore, the infrared spectrum of the compounds showed a carbonyl absorption band which, in comparison with lactams, appeared transposed towards a shorter wavelength. This is due to the higher electron negativity of the sulfur attached to nitrogen in the lactam sulfide as compared to the hydrogen attached to nitrogen in the lactam, which impedes in the compounds of the present invention the formation of the mesomeric form

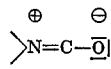

which is responsible for absorption in the long wave range.

The following examples will be given as illustrative only without, however, limiting the invention to the specific details of the examples.

Examples I–III are directed to the preparation of N,N'-monosulfides, and Examples IV–XI are directed to preparation of N,N'-disulfides.

EXAMPLE I

N,N'-di-(α-pyrrolidone)-monosulfide 8.5 grams α-pyrrolidone are dissolved in 50 ml. trichloroethylene and 8.7 g. pyridine and thereafter, while stirring and cooling 5.0 g. SCl₂ are drop-wise added to the reaction mixture. A precipitate of pyridine-hydrochloride is formed and sucked off and the filtrate concentrated.

Benzene is added to the concentrated filtrate and thereupon the N,N'-di-(α-pyrrolidone)-monosulfide crystallizes and can be recovered in a yield of 60% of the theoretical yield.

Melting point (from benzene/petroleumether) 134–136° C.

According to the thin layer chromatogram, the substance was free of impurities.

Elementary analysis gave the following results:

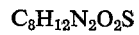

(M=200.3). Theoretical (percent): C, 47.99; H, 6.04; N, 13.99; S, 16.00. Actual (percent): C, 48.21; H, 6.31; N, 13.94; S, 15.83.

In a comparison experiment, a solution of 5.75 g. (0.05 mol) N-propyl-propionic acid amide in 30 ml. benzene and 4.4 g. pyridine was formed and 2.6 g. (0.025 mol) SCl₂ were dropwise introduced under stirring at a temperature of about 18° C. and stirring of the thus formed mixture was continued for 1 hour. The precipitated pyridine hydrochloride and precipitated sulfur were sucked off and the filtrate evaporated.

Thin layer chromatographic analysis of the residue showed only the starting material N-propylpropionic acid amide and sulfur in addition to a few other compounds which could not be identified, but no N,N'-monosulfide.

EXAMPLE II

N,N'-di(ε-caprolactam)-monosulfide 2.6 g. SCl₂ were dropwise added under stirring at a temperature of about 15° C. to a solution of 5.7 g. ε-caprolactam in 30 ml. trichloroethylene and 4 g. pyridine. While maintaining a temperature of 15° C., stirring was continued for 1½ hours. Thereafter, the reaction mixture was washed with water, the organic phase dried with sodium sulfate and, after filtration, concentrated. Upon addition of benzine, 4.1 g. (64% of the theoretical yield) of N,N' - di - (ε-caprolactam)-monosulfide were obtained which product, after crystallization from benzene/benzine was found to have a melting point of 135–137° C.

Elementary analysis gave the following results:

$$C_{12}H_{20}N_2O_2S$$

(M=256.4). Theoretical (percent): C, 56.22; H, 7.86; N, 10.93; S, 12.51. Actual (percent): C, 56.23; H, 8.05; N, 10.98; S, 12.81.

EXAMPLE III

N,N'-di(ε-caprolactam)-monosulfide

According to the present example, excess lactam was used as acid acceptor.

2.6 g. sulfurdichloride in 5 ml. trichloroethylene were dropwise added to 17.1 g. ε-caprolactam dissolved in 30 ml. trichloroethylene. After stirring for one hour at about 18° C. the reaction mixture was washed with dilute hydrochloric acid and water, the organic phase dried over $CaCl_2$ and, after filtration, concentrated.

Upon the addition of benzine, a precipitate consisting of N,N'-di(ε-caprolactam)-monosulfide was formed in a yield of 4 g. (16% of the theoretical yield based on $SCl_2$); melting point 134–136° C.

From the aqueous phase, after neutralizing, evaporating of the residue with trichloroethylene, the excess ε-caprolactam was recovered in a nearly quantitative yield.

EXAMPLE IV (N,N'-di-(α-pyrrolidone)-disulfide, pyridine as acceptor 12.7 g. α-pyrrolidone were dissolved in 39 ml. benzene, 12 g. pyridine were added and 10.1 g. disulfurdichloride dissolved in 10 ml. benzene were dropwise added to the thus formed solution at a temperature of between 5 and 10° C. The mixture was then stirred for 1 hour at room temperature and the precipitated pyridine hydrochloride was sucked off, the filtrate concentrated and benzine added to the concentrated filtrate. Thereby a precipitate was formed which was separated by suction from the liquid phase and dried under vacuum. The captioned product was obtained in a yield of 10 g. (64% of the theoretical yield) in the form of white crystals having a melting point of between 97–101° C.

Elementary analysis: $C_8H_{12}N_2O_2S_2$ (232.3). Theoretical (percent): C, 41.38; H, 5.25; N, 12.07; S, 27.60. Actual (percent): C, 41.00; H, 5.10; N, 11.86; S, 28.01.

In a comparison experiment, N-propyl-propionamide was reacted with disulfurdichloride in the following manner:

5.75 g. N-propyl-propionamide were dissolved in 20 ml. absolute benzene and 4 g. pyridine, and 2.6 g. disulfurdichloride were dropwise added while stirring to thus formed solution at a temperature of between 5 and 10° C. Stirring was then continued at ambient temperature for 1 hour. The precipitated pyridine-hydrochloride was separated by filtration and the filtrate evaporated under vacuum. 5.6 g. of a brown oil remained. This product showed 8 spots in a thin layer chromatogram ("Kieselgel-H" of Merck, with benzene:methanol 100:3, spots rendered visible by placement in an iodine chamber). The mixture could not be separated by columnar chromatography. Upon standing, the mixed product continued to split off sulfur.

EXAMPLE V

N,N'-di-(α-pyrrolidone)-disulfide, excess pyrrolidone as acceptor

According to the present example, the lactam was used as acid acceptor.

10.6 g. α-pyrrolidone were dissolved in 30 ml. trichloroethylene and reacted with 3.5 g. disulfurdichloride (molar ratio 5:1), as described in Example IV. The reaction solution was washed with water, dried over calcium chloride and the trichloroethylene evaporated. The thus obtained product (yield 45%) was found by its infrared spectrum and determination of its melting point to be identical with the product obtained according to Example IV.

EXAMPLE VI

N,N'-di-(α-piperidone)-disulfide, pyridine as acceptor 5 g. α-piperidone and 4.1 g. pyridine were dissolved in 20 ml. benzene and to the thus formed solution 3.4 g. disulfurdichloride dissolved in 5 ml. benzene were dropwise added at a temperature of between 5 and 10° C.

The mixture was then stirred for 1 hour at ambient temperature. The precipitated pyridine hydrochloride was sucked off and the filtrate concentrated. After adding benzine to the concentrated filtrate, the thereby precipitated crystals were sucked off and dried; Yield 4.3 g. (60% of theoretical yield), melting point 67–73° C. After twice recrystallizing from benzene/benzine, the product showed a melting point of between 72–74° C.

Elementary analysis: $C_{10}H_{16}N_2O_2S_2$ (260.8). Theoretical (percent): C, 46.15; H, 6.20; N, 10.77; S, 24.63. Actual (percent): C, 46.47; H, 6.28; N, 10.52; S, 24.86.

EXAMPLE VII

N,N'-di(ε-caprolactam)-disulfide, pyridine as acceptor 5.7 g. ε-caprolactam and 4.8 g. pyridine were dissolved in 25 ml. trichloroethylene, and 3.4 g. disulfurdichloride in 5 ml. trichloroethylene were dropwise added at a temperature of 20° C. After stirring the mixture for one hour at room temperature, the reaction solution was washed to neutral with water, dried over $CaCl_2$ and concentrated. After the addition of benzine, the reaction product precipitated in the form of white crystals. The yield was 4.3 g. (60% of the theoretical yield), melting point 103–116° C. As could be seen in the thin layer chromatogram, the product was contaminated with small amounts of N,N'-di-(ε-caprolactam)-monosulfide. After repeated recrystallization of columnar chromatography a pure disulfide melting at 132–134° C. was obtained.

Elementary analysis: $C_{12}H_{20}N_2O_2S_2$ (288.4). Theoretical (percent): C, 49.99; H, 6.99; N, 9.27; S, 22.23. Actual (percent): C, 50.00; H, 6.68; N, 9.00; S, 22.01.

EXAMPLE VIII

N,N'-di-(ε-caprolactam)-disulfide, excess lactam as acceptor 17.1 g. caprolactam were dissolved in 30 ml. trichloroethylene, and 3.4 g. disulfurdichloride in 5 ml. trichloroethylene were dropwise added at room temperature. The reaction solution was then washed once with 20 ml. 0.1 n HCl and three times with 20 ml. water, dried with $CaCl_2$ and concentrated. After addition of benzine to the dried and concentrated solution, 5.5 g. (76% of the theoretical yield calculated for $S_2Cl_2$) of a monosulfide-free product, having a melting point between 128–130° C. was obtained. The excess ε-caprolactam was recovered from the aqueous phase in a nearly quantitative yield by neutralizing, evaporating and extracting with trichloroethylene.

EXAMPLE IX

N,N'-di-(ε-caprolactam)-disulfide, excess lactam as acceptor, without solvent 28.3 g. caprolactam were mixed with 6.75 g. disulfurdichloride and the mixture ground in a mortar. The first formed liquid mixture solidified upon standing for 5 minutes. After allowing the mixture to stand for one hour, 50 ml. water were added and the water-insoluble N,N'-dicaprolactamdisulfide was sucked off. The yield of dry, crude product amounted to 78% of the theoretical yield and the crude product had a melting point of between 102 and 116° C.

EXAMPLE X

N,N′-di-(ε-caprolactam)-disulfide from metal salt

A suspension of ε-caprolactam-sodium in xylene (produced from 5.7 g. ε-caprolactam according to L. G. Donaruma et al., J. Heterocycl. Chem., 1 (1964), p. 48) was mixed with 3.4 g. disulfurdichloride and the mixture stirred for 24 hours at 40° C. After sucking off the precipitated sodium chloride, the solvent was evaporated under vacuum and benzine added to the residue. The thereby precipitated product was sucked off and obtained in a yield equal to 60% of the theoretical yield. It had a melting point of between 110–118° C.

EXAMPLE XI

N,N′-di-(capryllactam)-disulfide (a) 7.05 g. capryllactam in 30 ml. benzene and 4.4 g. pyridine were reacted with 3.4 g. disulfurdichloride. 8.5 g. of a light brown oil were obtained.

(b) 17.6 g. (0.25 mol) capryllactam in 40 ml. trichloroethylene were reacted with 3.4 g. disulfurdichloride and worked up as described in Example VIII. 8.8 g. of an oily product were obtained.

The crude products obtained according to (a) and (b) were combined and subjected to chromatographic treatment in a silica gel column (silica gel 0.05–0.2 mm. of Merck & Co.) with benzene:acetone 100:20.

7 g. (40% of the theoretical yield) of crystallized N,N′-di-(capryllactam)-disulfide were obtained. The product, after recrystallization from benzene/benzine had a melting point of 81–83° C.

Elementary analysis: $C_{16}H_{28}N_2O_2S_2$ (M=344.56). Theoretical (percent): C, 55.77; H, 8.19; N, 8.13; S, 18.61. Actual (percent): C, 55.76; H, 7.95; N, 7.87; S, 18.55.

Other N,N′-disulfides may be produced in a similar manner, the final product depending on the specific starting material, for instance, as described by way of example in the following table:

| Starting material | N,N′-disulfide produced |
|---|---|
| φ-Enanthlactam | N,N′-di-(φ-enanthlactam)-disulfide |
| Caprinlactam | N,N′-di-caprinlactam-disulfide |
| Laurinlactam | N,N′-di-laurinlactam-disulfide |
| ε-Ethyl-ε-caprolactam | N,N′-di-(ε-ethyl-ε-caprolactam) disulfide |
| φ-Ethyl-φ-enanthlactam | N,N′-di-(φ-ethyl-φ-enanthlactam)-disulfide |

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

What is claimed is:

1. A compound of the formula

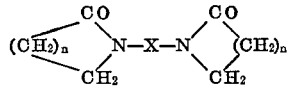

wherein X is either S or S—S, and n is an integer between 2 and 10, both inclusive and both n are the same.

2. The compound as defined in claim 1, wherein n is an integer between 2 and 6, both inclusive.

3. The compound as defined in claim 1, and consisting of compounds of the formula

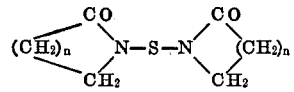

4. The compound as defined in claim 3, consisting of N,N′-di-(α-pyrrolidone)-monosulfide or N,N′-di-(ε-caprolactam)-monosulfide.

5. The compound as defined in claim 1 and consisting of compounds of the formula

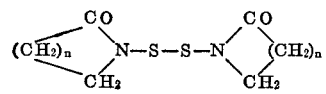

6. The compound as defined in claim 5, consisting of N,N′-di-(α-pyrrolidone)-disulfide, N,N(-di(α-piperdone)-disulfide, N,N′-di-(ε-caprolactam)-disulfide or N,N′-di-(caprolactam)-disulfide.

7. A mehtod of producing the compounds of claim 1 comprising the step of mixing a lactam selected from the group consisting of

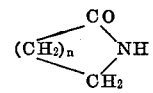

and

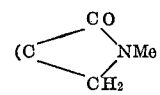

wherein n is an integer from 2 to 10 and Me is a metal with a sulfur compound selected from the group consisting of sulfurdichloride ($SCl_2$) and disulfurchloride $S_2Cl_2$), the molar ratio of lactam to sulfur compound being at least 2:1, and permitting components to react at a temperature between about 5° C. and about 40° C. followed by separating the N-N′ sulfide or disulfide lactam from the reaction mass.

8. A method as defined in claim 7, wherein said reacting is carried out in the presence of an acid acceptor and wherein after completion of the reaction the formed acid compound is separated from said N-N′ sulfide or disulfide lactam.

9. The method of claim 8 wherein the said acid acceptor is selected from the group consisting of tertiary amines, inorganic bases and their carbonate or bicarbonate salts.

10. A method as defined in claim 9, wherein said acid acceptor is lactam in excess of the amount thereof which is reacted with said substance.

11. A method as defined in claim 7, wherein the lactam ring includes between 3 and 12 carbon atoms, both inclusive.

12. A method as defined in claim 11, wherein said lactam ring includes between 4 and 8 carbon atoms, both inclusive.

13. A method as defined in claim 7, wherein said sulfur compound is sulfurdichloride and the lactam ring of said lactam includes between 3 and 12 carbon atoms, both inclusive.

14. A method as defined in claim 7, wherein said sulfur compound is disulfurdichloride and the lactam ring of said lactam includes between 3 and 12 carbon atoms, both inclusive.

15. A method as defined in claim 8, wherein said acid acceptor is an excess amount of lactam.

16. The method of claim 7, wherein the reaction is carried out in the presence of a solvent for the lactam and wherein after completion of the reaction the resulting dicaprolactam sulfide is precipitated from the solution.

17. The method of claim 15, wherein benzene or trichloroethylene are employed as solvent.

18. The method of claim 15, wherein gasoline is employed as the precipitating agent.

References Cited

UNITED STATES PATENTS 2,832,770  4/1958  Hopkins et al. ------ 260—239.3

HENRY R. JILES, Primary Examiner

R. T. BOND, Assistant Examiner

U.S. Cl. X.R.

260—239, 293.4, 293.49, 326.5; 424—267